United States Patent
Liu et al.

(10) Patent No.: US 9,905,199 B2
(45) Date of Patent: Feb. 27, 2018

(54) PROCESSOR FOR USE IN DYNAMIC REFRESH RATE SWITCHING AND RELATED ELECTRONIC DEVICE AND METHOD

(71) Applicant: MEDIATEK INC., Hsin-Chu (TW)

(72) Inventors: Chang-Chu Liu, Hsinchu (TW); Shu-Wen Teng, Hsinchu (TW); Ta-Lun Huang, Hsinchu (TW); Chun-Wei Ku, Hsinchu (TW); Chien-Chou Ko, Hsinchu (TW); Hao-Ting Huang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/831,879

(22) Filed: Aug. 21, 2015

(65) Prior Publication Data
US 2016/0078846 A1   Mar. 17, 2016

Related U.S. Application Data

(60) Provisional application No. 62/051,328, filed on Sep. 17, 2014, provisional application No. 62/117,075, filed on Feb. 17, 2015.

(51) Int. Cl.
*G09G 5/36* (2006.01)
*G09G 3/36* (2006.01)
(Continued)

(52) U.S. Cl.
CPC .................. *G09G 5/18* (2013.01); *G06T 1/00* (2013.01); *G09G 5/006* (2013.01); *G09G 5/12* (2013.01);
(Continued)

(58) Field of Classification Search
CPC ........... G09G 3/2096; G09G 5/39; G09G 3/36
See application file for complete search history.

(56) References Cited

U.S. PATENT DOCUMENTS

| | | | | |
|---|---|---|---|---|
| 5,874,928 A | * | 2/1999 | Kou | ....................... G06F 3/1475 345/1.1 |
| 7,671,873 B1 | * | 3/2010 | Pierini | ....................... G06F 3/14 345/603 |

(Continued)

FOREIGN PATENT DOCUMENTS

| | | |
|---|---|---|
| CN | 103593155 A | 2/2014 |
| TW | 201241739 A1 | 10/2012 |

(Continued)

*Primary Examiner* — Lin Li
(74) *Attorney, Agent, or Firm* — Han IP Corporation; Andy M. Han

(57) ABSTRACT

A processor for use in an electronic device is provided. The electronic device is capable of displaying and the processor has capability of switching a refresh rate for refreshing a display panel of the display device. The processor comprises: a refresh rate selection controller and a display controller. The refresh rate selection controller is configured to dynamically select one from a plurality refresh rates. The display controller is configured to control a driving device to refresh the display panel with the selected refresh rate and determine whether to adjust a data transmission rate over an interface between the processor and the driving device according to the selected refresh rate.

61 Claims, 5 Drawing Sheets

(Video Mode)

(51) Int. Cl.

| | | |
|---|---|---|
| *G06F 3/14* | (2006.01) | |
| *G09G 3/20* | (2006.01) | |
| *G06T 15/10* | (2011.01) | |
| *H04N 7/01* | (2006.01) | |
| *H04L 12/24* | (2006.01) | |
| *G09G 5/39* | (2006.01) | |
| *G06F 13/24* | (2006.01) | |
| *G06F 1/32* | (2006.01) | |
| *G09G 5/14* | (2006.01) | |
| *G09G 5/18* | (2006.01) | |
| *G06T 1/00* | (2006.01) | |
| *G09G 5/00* | (2006.01) | |
| *G09G 5/12* | (2006.01) | |

(52) U.S. Cl.
CPC ... *G09G 2330/021* (2013.01); *G09G 2340/02* (2013.01); *G09G 2340/0435* (2013.01); *G09G 2350/00* (2013.01); *G09G 2360/18* (2013.01)

(56) References Cited

U.S. PATENT DOCUMENTS

| | | |
|---|---|---|
| 8,334,857 B1 | 12/2012 | Ogrinc et al. |
| 9,684,976 B2 | 6/2017 | Finkel |
| 2004/0125099 A1 | 7/2004 | Stanley et al. |
| 2004/0252115 A1 | 12/2004 | Boireau |
| 2006/0007227 A1* | 1/2006 | Hahn ............... G06T 15/10 345/418 |
| 2008/0055318 A1 | 3/2008 | Glen |
| 2008/0100598 A1* | 5/2008 | Juenger ............. G09G 5/36 345/204 |
| 2009/0049220 A1* | 2/2009 | Conti ............... G06F 13/24 710/267 |
| 2009/0150898 A1 | 6/2009 | Sohn et al. |
| 2009/0157936 A1* | 6/2009 | Goss ................. G06F 1/3203 710/264 |
| 2009/0252227 A1 | 10/2009 | NepomucenoLeung et al. |
| 2012/0068993 A1 | 3/2012 | Kambhatla et al. |
| 2012/0098864 A1* | 4/2012 | Chowdhry ........... G09G 5/14 345/660 |
| 2012/0146968 A1 | 6/2012 | Glen |
| 2013/0021352 A1* | 1/2013 | Wyatt ................. G09G 5/395 345/520 |
| 2013/0141642 A1 | 6/2013 | Wu et al. |
| 2013/0162550 A1 | 6/2013 | Chen et al. |
| 2013/0187962 A1 | 7/2013 | Vieri et al. |
| 2013/0265294 A1 | 10/2013 | Kim |
| 2013/0278614 A1 | 10/2013 | Sultenfuss et al. |
| 2014/0045543 A1* | 2/2014 | Ishii .................. H04W 52/365 455/522 |
| 2014/0082147 A1* | 3/2014 | Pazos ................ H04L 41/0896 709/219 |
| 2014/0160182 A1* | 6/2014 | Hong ................ G09G 3/3696 345/691 |
| 2014/0168197 A1 | 6/2014 | Kobayashi |
| 2014/0368484 A1* | 12/2014 | Tanaka ............. G09G 3/3648 345/208 |
| 2014/0368492 A1 | 12/2014 | Fujioka et al. |
| 2015/0015591 A1* | 1/2015 | Oh ..................... G06F 3/14 345/519 |
| 2015/0138212 A1* | 5/2015 | Bae .................. G09G 3/2096 345/520 |
| 2015/0243253 A1* | 8/2015 | Sone ................ G09G 3/2096 345/209 |
| 2016/0293130 A1* | 10/2016 | Nishiguchi ......... G09G 3/36 |

FOREIGN PATENT DOCUMENTS

| | | |
|---|---|---|
| TW | 201314526 A1 | 4/2013 |
| TW | 201337536 A | 9/2013 |

* cited by examiner

PROCESSOR FOR USE IN DYNAMIC REFRESH RATE SWITCHING AND RELATED ELECTRONIC DEVICE AND METHOD

CROSS REFERENCE TO RELATED APPLICATIONS

This application claims the benefit of U.S. Provisional Application No. 62/051,328, filed on Sep. 17, 2014, and U.S. Provisional Application No. 62/117,075, filed on Feb. 17, 2015. The entire contents of the related applications are incorporated herein by reference.

BACKGROUND

The disclosure relates to refresh rate switching, and more specifically, to a processor and an electronic device having the capability of dynamically switching a refresh rate of a display panel and adjusting a data transmission rate over an interface for interfacing a driving device that drives the display panel. The disclosure also relates to a method for switching a refresh rate of a display panel in an electronic device.

A display device is periodically refreshed with images to be presented. In a typical display device, a driving device, such as display driver integrated chip (DDIC), receives image data of images to be presented from a graphic processor unit (GPU) or a display-related circuit that hosts the display device, and according to received image data, a timing controller in the driving device directs source drivers and gate drivers in the driving device to apply proper voltages to pixels of a display panel in the display device, thereby presenting the images. A rate at which the images change from one to another, or are refreshed, on the display panel is called refresh rate. This rate is normally identical to the rate at which the GPU or the display-related circuit updates a buffer circuit in the driving device operating in video mode but not necessarily identical to the update rate in command mode.

Nowadays, the display device can be operated at high refresh rates, such as, 120 Hz, 240 Hz, or even higher, which is significantly higher than the refresh rate of 60 Hz on a traditional display device. High refresh rate can smooth out fast-moving contents, such as action movies or sporting events, on the display device, which leads to less motion blur and therefore great user's visual experience. However, high refresh rate also means high power consumption.

Sometimes, the display device may be incorporated in a compact and portable embedded computer system, such as smartphone, tablet, laptop, electronic book, and multimedia player. In such devices, electrical power is limited and exhaustible as provided by a battery, and the display device may consume a significant portion of the limited battery power. The high refresh rate of the display device makes the compact/portable electronic system struggle with the battery power since operations of the GPU or the display-related circuit updating the buffer circuit as well as the driving circuit driving the display panel drains lot of power from the battery. The higher the refresh rate, the more power the electronic device consumes.

Therefore, there is a need for providing a solution that can dynamically switch the refresh rate of the display device to meet different requirements such as minimizing power consumption and/or enhancing user's visual experience.

SUMMARY

Embodiments of the present disclosure provides a solution to meet different design or operation requirements for a display device or an electronic device capable of displaying, such as to guarantee user's visual experience in watching moving contents and/or minimize power consumption. Embodiments of the present disclosure provide a processor that is able to dynamically switching a refresh rate of a display panel in an electronic device. The display panel in embodiments of the present disclosure can be dynamically operable at a wide or selectable range of refresh rates. In some embodiments, the processor can select a proper refresh rate according to current usage scenario and without having the user directly involved in. In order to satisfy requirement of high throughput of a data interface while driving the display panel at high refresh rate operations, embodiments of the present disclosure further provide approaches to adjusting a data transmission rate over the data interface between a driving device for driving the display panel and a processor.

According to one embodiment of the present invention, a processor for use in an electronic device is provided. The electronic device is capable of displaying and the processor has capability of switching a refresh rate for refreshing a display panel of the display device. The processor comprises: a refresh rate selection controller and a display controller. The refresh rate selection controller is configured to dynamically select one from a plurality refresh rates. The display controller is configured to control a driving device to refresh the display panel with the selected refresh rate and determine whether to adjust a data transmission rate over an interface between the processor and the driving device according to the selected refresh rate.

According to one embodiment of the present invention, an electronic device comprises a display panel, a driving device and a processor. The driving device is configured to drive the display panel. The processor is configured to control the driving device to refresh the display panel with a selected refresh rate and determine whether to adjust a data transmission rate over an interface between the processor and the driving device according to the selected refresh rate.

According to one embodiment of the present invention, a method is provided for switching a refresh rate of a display panel in an electronic device. The method comprises dynamically selecting one refresh rate from a plurality refresh rates, providing a control signal to a driving device to control the driving device to refresh the display panel with the selected refresh rate, and determining whether to adjust a data transmission rate at which image data is provided to the driving device according to the selected refresh rate.

According to the embodiments of the disclosure, a plurality refresh rates can be dynamically selected without a direct setting of the refresh rate by a user. As such, a suitable refresh rate can be selected for the current usage scenario, thereby allowing various design and operation requirements to be met. Consequently, power consumption can be reduced in conditions of limited battery power of the electronic device, power efficiency can be improved, waste of power consumption can be reduced, and/or user's visual experience can be enhanced.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following descriptions and claims to refer to particular system components. As one skilled in the art will appreciate, manufacturers may refer to a component by different names. This document does not intend to distinguish between components that differ in name but not differ in function. In the following discussion and in the claims, the terms "include", "including", "comprise", and "comprising" are used in an open-ended fashion, and thus should be interpreted to mean "including, but not limited to . . . " The terms "couple" and "coupled" are intended to mean either an indirect or a direct electrical connection. Thus, if a first device couples to a second device, that connection may be through a direct electrical connection, or through an indirect electrical connection via other devices and connections.

Electronic Device of the Present Disclosure

Figure 1:
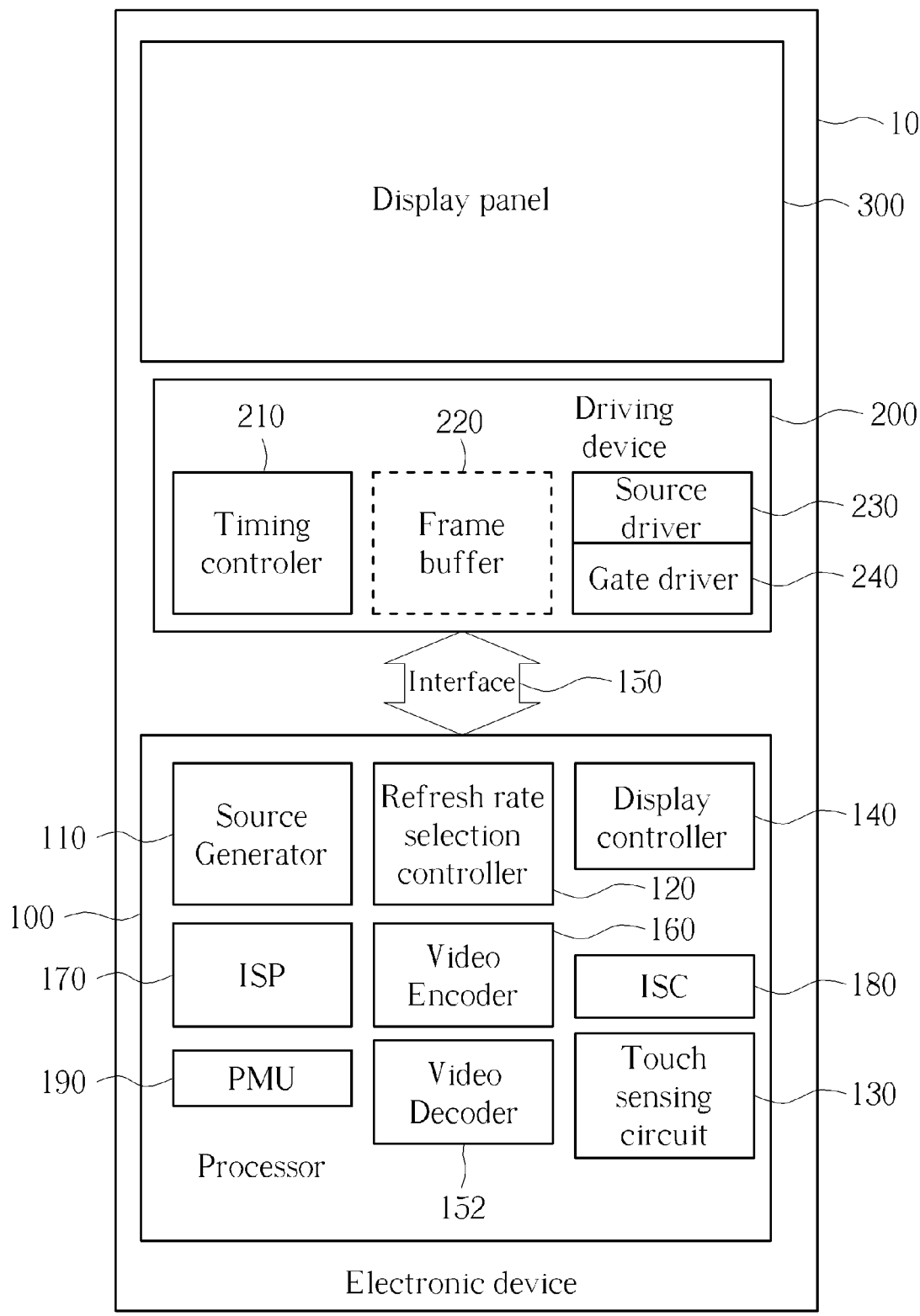
FIG. 1 illustrates a block diagram of an electronic device that incorporates the aspects of the present disclosure.

FIG. 1 illustrates an electronic device incorporating aspects of the present invention. As illustrated, an electronic device 10 comprises: a processor 100, a driving device 200 and a display panel 300. The processor 100 could be implemented with a general-purpose processor, a dedicated processor or even an application processor. The display panel 300 could be a flat-panel, such as plasma panel, OLED panel, or TFT LCD panel. Preferably but not limitedly, the display panel 300 may further have touch driving and sensing electrodes thereon (not shown) and provides the functionality of touch sensing. The display panel 300 is operable to display images with adjustable refresh rates. Specifically, the display panel 300 can be operable with a plurality of possible refresh rates and dynamically operate with one of the possible refresh rates. The driving device 200 is coupled to the display panel 300 and configured to drive the display panel 300 at any of possible refresh rates. In various embodiments, the display panel 300 could be driven by the driving device 200 at any of a plurality of refresh rates including 30 Hz, 60 Hz, 120 Hz or even higher to display images. The driving device 200 may comprise a timing controller 210, an optional buffer circuit 220 and one or more source drivers 230 and one or more gate drivers 240.

The processor 100 can be used to dynamically switch a refresh rate for refreshing the display panel 300. The processor 100 may comprise (but not limited to) a refresh rate selection controller 120 and a display controller 140. The refresh rate selection controller 120 can be configured to select one from a plurality of refresh rates. The display controller 140 can be configured to control the driving device 200 to refresh the display panel 300 with the selected refresh rate and adjust a data transmission rate over an interface 150 between the processor 100 and the driving device 200 according to the selected refresh rate.

In one embodiment, the refresh rate selection controller 120 selects a proper refresh rate that is suitable for current usage scenarios. For example, the refresh rate selection controller 120 may select the proper refresh rate in order to minimize the power consumption and/or improve user's visual experience (less motion blur). Detailed principles of selection of the refresh rate will be explained later in further details.

In embodiments of the disclosure, after a certain refresh rate is selected by the processor 100, refresh rate with which the driving device 200 refreshes the display panel 300 and transmission rate of image data from the display controller 140 to the driving device 200 can be both adjusted to be synchronized or compatible with each other. To achieve this, the driving device 200 can be responsive to the selection by the processor 10 to refresh the display panel 300 with the selected refresh rate. In addition, the processor 100 can also adjust its transmitting capability by adjusting a data transmission rate over the interface 150 between the processor 100 and the driving device 200 to support or accommodate the change of the refresh rate at which the driving device 200 refreshes the display panel 300.

With respect to the controlling the driving device 200 to refresh the display panel 300 with the selected refresh rate, one of more control signals generated by either of both of the processor 100 and the driving device 200 involved in applying the selected refresh rate to refresh the display panel 300 can be used for the controlling. Specifically, the control signal may be a command signal or a timing control signal involved in the communication between the processor 100 and the driving device 200. In one embodiment, a timing control signal passed from the processor 100 to the driving device 200, e.g., a V-sync signal, is utilized to achieve the controlling. In another embodiment, a command signal passed from the processor 100 to the driving device 200, is utilized to achieve the controlling, which is accompanied by an corresponding adjustment of a timing control signal passed from the driving device 200 to the processor 100, e.g., a tearing effect (TE) signal.

With respect to the adjustment of the data transmission rate over the interface 150, which is performed to support or adapt to the change of the selected refresh rate, a clock signal, a timing control signal, and/or a number of transmission paths used for transmitting data over the interface 150 and/or controlling compressing on the data over the interface 150, can be used to achieve the adjustment. In addition, after the adjusting, a bandwidth of the interface can be maintained or changed correspondingly.

In one embodiment, in determining which one of a plurality of the possible refresh rate to select, the processor 100 can refer to information about a current scenario of the electronic device 10. The current scenario may indicate whether any of one or more predetermined events occurs. For example, the one or more predetermined events comprises at least one of web browsing, an execution of a high quality video game, a high quality video playback, a touch event, a low power event, a system status, and/or an increased/decreased frame rate of an image/video stream processed by the processor or provided by application software. Alternatively or additively, the current scenario may indicate a detected frame rate of an image/video stream processed by the processor 100. Alternatively or additively, the current scenario may indicate an operation mode of an electronic device. As such, a suitable refresh rate can be selected for the current usage scenario, thereby allowing various design and operation requirements to be met. In addition, the plurality possible refresh rates can be dynamically selected by the processor 100 which is therefore not required to response a direct setting of the refresh rate by a user in determining the refresh rate. Consequently, power consumption of the electronic device 10 can be reduced in low power conditions and/or user's visual experience can be enhanced.

In embodiments of the present disclosure, either of both of two modes can be implemented for dynamically adjusting the refreshing of the display panel 300 and adaptively change the transmission rate of image data. It is noted that while two modes are utilized for explaining the disclosure, the disclosure is not limited thereto.

Adjustment on Refreshing of Display Panel

Figure 2:
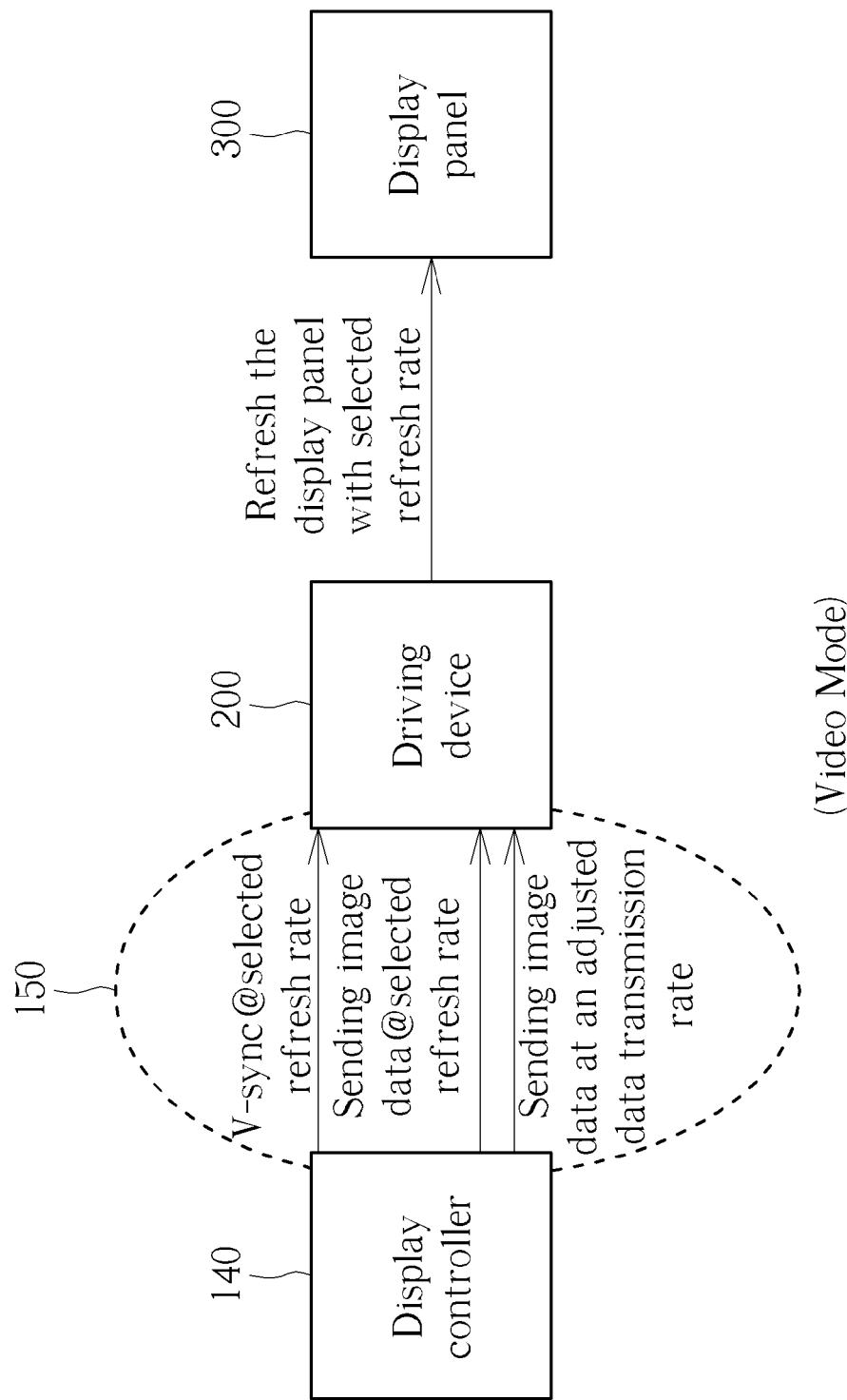
FIG. 2 illustrates how to adjust the refresh rate of the display panel and the transmission rate of image data in a video mode according to one embodiment of the present disclosure.

FIG. 2 illustrates how to dynamically adjust the refreshing of the display panel 300 and adaptively change transmission rate of image data in a video mode according to an embodiment of the disclosure. The embodiment of FIG. 2 can be applied to the electronic device 10 in FIG. 1 but not limited thereto. In the video mode, the display controller 140 allows the driving device 200 to change the refresh rate by sending a timing control signal. Preferably, the timing control signal is a V-sync signal. After the refresh rate selection controller 120 selects a certain refresh rate, the display controller 140 changes a frequency of the V-sync signal to be identical to the selected refresh rate. Accordingly, the timing controller 210, receiving and operating according to the V-sync signal, can control the source drivers 230 and the gate driver 240 to drive the display panel 300 at the selected refresh rate. Based on image data transmitted from the display controller 140, the timing controller 210 controls the source drivers 230 and the gate driver 240 apply corresponding voltages to the display panel 300 such that the display panel 300 display images/videos. In the video mode, the buffer circuit 220 can be bypassed or does not exist, and therefore the rate at which the driving device 200 refreshes the display panel 300 is consistent with the selected refresh rate.

Figure 3:
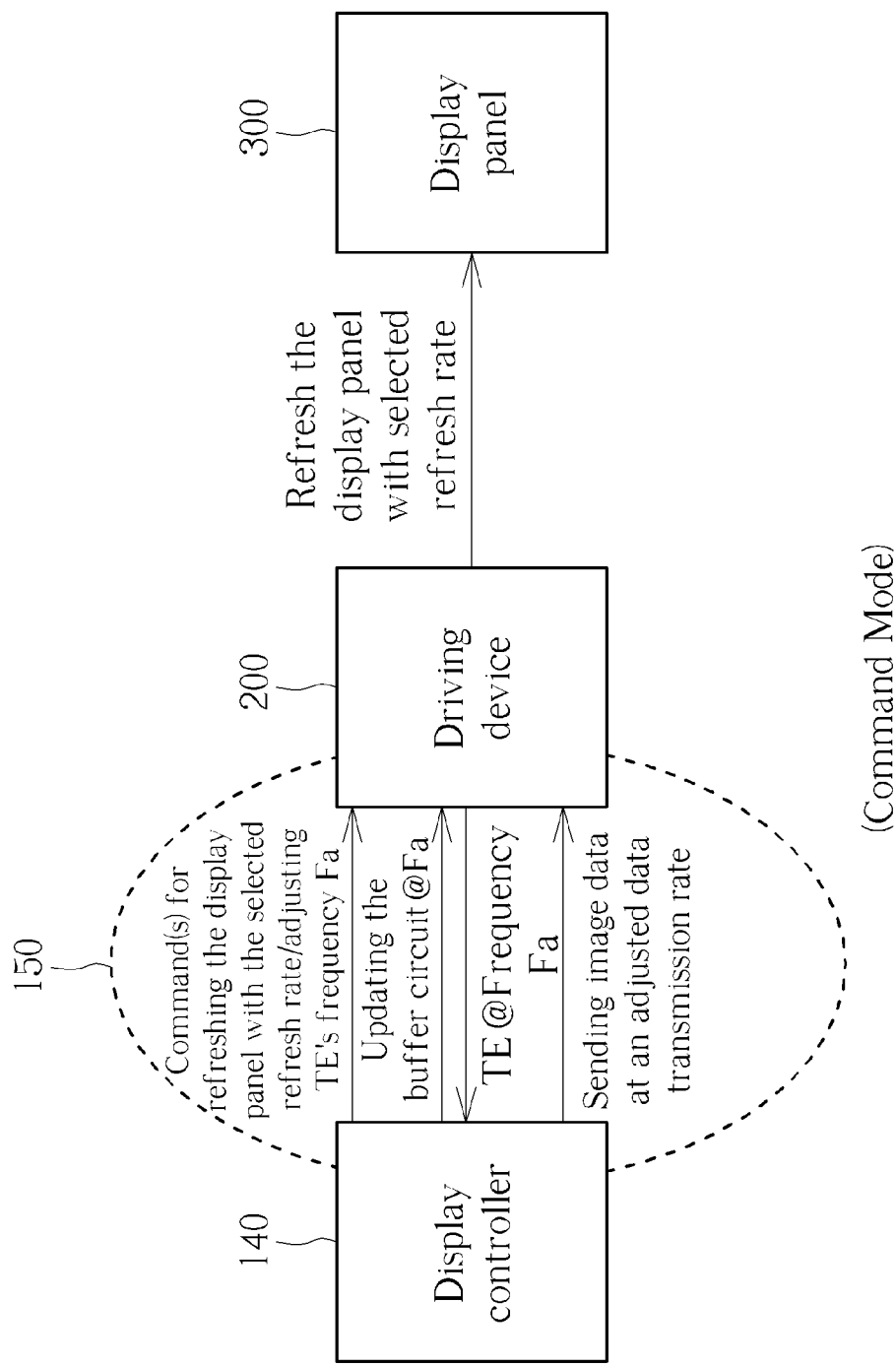
FIG. 3 illustrates how to adjust the refresh rate of the display panel 300 and the transmission rate of image data in a command mode according to one embodiment of the present disclosure.

FIG. 3 illustrates how to adjust the refreshing of the display panel 300 and adaptively change the transmission rate of image data in a command mode according to an embodiment of the disclosure. The embodiment of FIG. 3 can be applied to the electronic device 10 in FIG. 1 but not limited thereto. In the command mode, the display controller 140 firstly sends a command to the driving device 200 once the refresh rate selection controller 120 selects a certain refresh rate. Upon receiving the command, the driving device 200 can refresh the display panel 300 with the selected refresh rate indicated by the command, according to contents provided by the buffer circuit (e.g., Gram) 220. It is noted that the command may be sent prior to the adjustment of the frequency of the TE signal.

In addition, the driving device 200 further sends a timing control signal to the display controller 140. The timing controlling signal may be used for requesting the display controller 140 to update the buffer circuit 220 in the driving device 220, preferably but limitedly, a tearing effect (TE) signal.

The command sent by the processor 100 may not only direct the driving device 200 to refresh the display panel 300 with the selected refresh rate but also direct the driving device 200 to change the frequency of the timing control signal to be equal to the selected refresh rate. Alternatively, the processor 100 may send two separate commands at different times, wherein one command is for directing the driving device 200 to change the refresh rate and the other command is for directing the driving device 200 to change the frequency of the timing control signal.

In addition, in one embodiment, the driving device 200 may change the frequency of the timing control signal, and at the same time it also changes the refresh rate after the driving device 200 receives the one or more commands. Alternatively after the driving device 200 receives the one or two commands, the driving device 200 may change the frequency of the timing control signal before or after it changes the refresh rate, which can be performed to smooth the transition of the refresh rate.

The display controller 140 can then update the buffer circuit 220 according to a frequency Fa of the TE signal. Specifically, the display controller 140 may update the buffer circuit 220 with an update frequency equal to the frequency Fa of the TE signal. However, the display controller 140 may not always need to update the buffer circuit 220. For example, the display controller 140 may not update the buffer circuit 220 when it determines that the contents of images are the same, or during transition of the refresh rate when it prepares for the transition.

It is also noted that the frequency of the timing control (e.g. TE) signal in the command mode is preferably but not limitedly equal to the refresh rate at which the display panel 300 is refreshed. For example, as previously described, since the driving device 200 may change the frequency of the timing control signal before or after it changes the refresh rate, the frequency of the timing control (e.g. TE) signal may be unequal to the refresh rate during the transition of the refresh rate. In other words, the timing control signal may have a frequency unequal to the selected refresh rate for at least a partial time.

Adjustment on Data Transmission Rate

When the processor 100 determines the refresh rate to switch to, the processor 110 also determines whether to adjust the data transmission rate over the interface 150. The adjustment on the data transmission rate means the processor 100 has different transmission capabilities. Once the refresh rate is increased, the display controller 140 may provide more images or refreshing the buffer circuit 220 more times when it determines the necessity. As previously described, the display controller 140 may not always need to update the buffer circuit 220. For example, it may not need to update when it determines that the contents of images are the same, or during transition of the refresh rate when it prepares for the transition.

Hence, a data transmission rate over the interface 150 between the processor 100 and the driving device 200 has to be increased since more images needs to be transmitted over the interface 150. For example, if the refresh rate changes from 60 Hz to 120 Hz, the data transmission rate over the interface 150 should be double. Similarly, once the refresh rate is decreased, the display controller 140 may provide less images or refreshing the buffer circuit 220 less times when it determines it is required.

According to various embodiments of the present invention, multiple ways of adjusting the data transmission rate are provided.

In one embodiment, the display controller 140 adjusts a clock rate of a clock used for transmitting image data over the interface 150. For example, the display controller 140 could adjust the clock rate of a reference clock signal on the interface 150, thereby increasing the data transmission rate. The display controller 140 increases the clock rate of the clock used for transmitting image data over the interface 150 once the refresh rate selection controller 120 selects a higher refresh rate than a previously selected refresh rate. In addition, the display controller 140 decreases the clock rate of the clock used for transmitting image data over the interface 150 once the refresh rate selection controller 120 selects a lower refresh rate than a previously selected refresh rate. By changing the clock rate of the clock for transmitting the image data, the data transmission rate over the interface 150 can be adjusted to be suitable for the selected refresh rate.

However, it should be noted that, in some embodiments, when the refresh rate is decreased, the display controller 140 may not decrease the clock rate for different purposes in implementation. This means that other implementations can be utilized to decrease the data transmission rate. In other words, different methods for adjusting the data transmission rate can be used according to design requirements. Further, both the run-time bandwidth and the maximum bandwidth of the interface 150 become higher/lower than before in the method.

Figure 4:
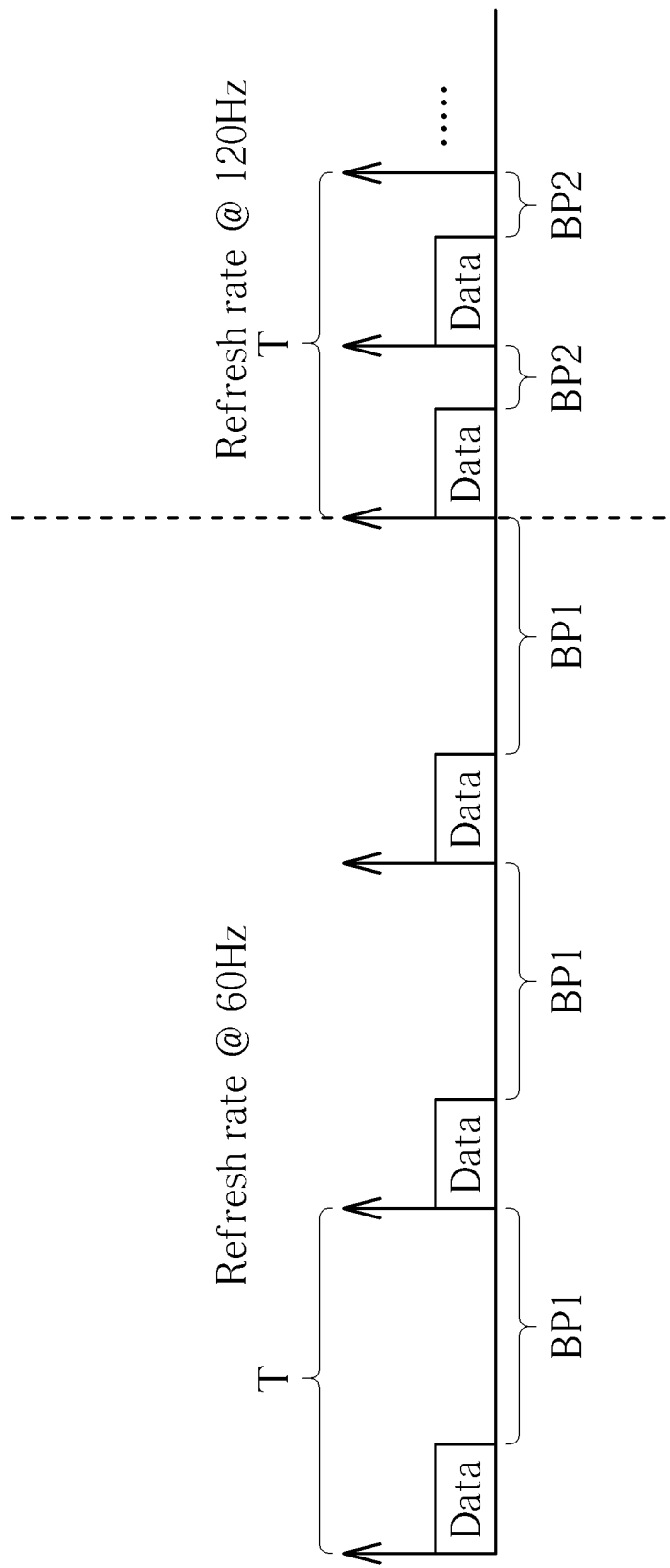
FIG. 4 illustrates how to adjust a data transmission rate over an interface by shortening a blanking/idle period between consecutive images according to one embodiment of the present disclosure.

In one embodiment, the clock rate is maintained. To achieve the adjustment on the data transmission rate with the same clock rate, a blanking/idle period between consecutive images can be shortened to increase the data transmission rate over the interface 150. Please refer to FIG. 4, which illustrates how to adjust the data transmission rate by changing the blanking/idle period. The blanking/idle period can be defined to be the duration in any given period when the data is not passed through the interface 150.

As illustrated, for the data transmission rate corresponding to the refresh rate at 60 Hz, the blanking/idle period between consecutive images is BP1, while the data transmission rate corresponding to the refresh rate at 120 Hz, the blanking/idle period between consecutive images is BP2. In a given period T, the shorter blanking/idled period BP2 allows the display controller 140 to transmit more image data to the driving device 200. Therefore, the data transmission rate is substantially increased. On the other hand, if the refresh rate is decreased by the refresh rate selection controller 120, the blanking/idle period could be lengthened. That is, by changing the blanking/idle period, the data transmission rate over the interface 150 can be adjusted to be in response to the changes of the refresh rate. In this embodiment, the maximum bandwidth of the interface 150 does not change and is maintained the same as unadjusted but the runtime bandwidth of the interface 150 is changed to achieve the change of the data transmission rate.

In one embodiment, the adjustment on the data transmission rate can be achieved by the display controller 140 controlling a number of data transmission paths over the interface 150. When the refresh rate is higher, the display controller 140 could allocate more transmission paths for transmitting the image data of the images, while when the refresh rate is lower, the display controller 140 could allocate fewer transmission paths for transmitting the image data of the images. The transmission paths could be data ports or data lanes of the interface 150. By changing the number of transmission paths allocated for transmitting the image data, the data transmission rate over the interface 150 can be adjusted to be suitable for the changes of the refresh rate. Further, both the run-time bandwidth and the maximum bandwidth of the interface 150 become higher/lower than before in the method.

In one embodiment, the adjustment on the data transmission rate can be achieved by adjusting a compression rate of an image data compression process. The display controller 140 could compress the image data before transmitting the image data to the driving device 200. If the compression rate is high, or the compression is enabled, more images can be transmitted to the driving device 200 during a unit of period. Hence, if the refresh rate selection controller 120 selects a higher refresh rate and requires a higher data transmission rate, the display controller 140 can increase the compression rate, and if the refresh rate selection controller 120 selects a lower refresh rate and requires a lower data transmission rate, the display controller 140 can decrease the compression rate or even disable the image data compression process, which can reduce the power consumption. In different implementations, the image data compression process could be performed by the display controller 140 or other hardware/software modules in or implemented by the processor 100. In this embodiment, the maximum bandwidth of the interface 150 does not change and is maintained the same as unadjusted but the runtime bandwidth of the interface 150 is changed to achieve the change of the data transmission rate.

Selection of the Refresh Rate

The refresh rate selection controller 120 could select the refresh rates according to usage scenario of the electronic device 10. The refresh rate selection controller 120 could obtain information about a current usage scenario or system status of the electronic device 10 from certain modules inside or externally coupled to the processor 100. Such information may indicate whether any of one or more predetermined events occurs. Some of these predetermined events cause the refresh rate selection controller 120 to select a higher refresh rate than a previous one, while some of predetermined events cause the refresh rate selection controller 120 to select a lower refresh rate than a previous one. The predetermined events comprises (but not limited to): web browsing, an execution of a high quality video game, a high quality video playback, a touch event, a low power event, a system status, and/or an increased/decreased frame rate of an image/video stream processed by the processor 100 or provided by application software running on the electronic device 10.

Low Power Events

Power level information provided by a power management unit (PMU) 190 in FIG. 1 could lead to a low power event to occur. In response to the low power event, the refresh rate selection controller 120 could select one of relatively low refresh rate to reduce the power consumption. Accordingly, the display controller 140 updates the buffer circuit 220 with the image data or transmits the image data to the driving device 200 with a low data transmission rate. According to various embodiments of the present invention, the PMU 190 could be inside the processor 100 or externally coupled to the processor 100, which monitors a power level of a power source (e.g. Lithium-ion battery) that supplies power to the processor 100, the driving device 200, the display panel 300 or even the electronic device 10. When the power level is indicated lower than a threshold level, the PMU 190 could detect the low power event to occur and cause the display panel 130 to be refreshed with a low refresh rate. As such, the power consumption could be reduced.

Touch Events

A touch sensing circuit 130 that is inside the processor 100 or externally coupled to the processor 100 could lead to a touch event. When an object or a user's finger is brought in proximity of the display panel 300 is detected, the touch event occurs. The refresh rate selection controller 120 could select a higher or the highest refresh rate of all the possible refresh rates. This is because the touch event may be followed by a touch-slide operation (which may occur when the user is doing web-browsing) on the display panel 300, which causes images including moving contents to be generated and to be presented on the display panel 300. In order to smooth out the moving contents, the refresh rate selection controller 120 could select a higher or the highest refresh rate to reduce the motion blur. On the other hand, the touch sensing circuit 130 could cause a touch-leaving event when detecting an object or a user's finger is brought away from the display panel 300. When the touch-leaving event occurs, the refresh rate selection controller 120 could select a lower or moderate refresh rate, other than the highest refresh rate since the images may not include moving contents at this moment.

Operation Mode

An operating system running on the electronic device 10 may determine an operation mode of the electronic device to manage the hardware resources based on power saving strategy and system performance strategy. For example, the operating system on the electronic device 10 may determine to enter a power-saving mode to extend the battery supplying time. When the electronic device 10 enters the power-saving mode, the refresh rate selection controller 120 could select a lower refresh rate, and when electronic device 10 leaves the power-saving mode, the refresh rate selection controller 120 could select a higher refresh rate or a moderate refresh rate. The selection of a higher refresh rate may occur for improving user experience.

If the user selects to need to execute some applications that requires more hardware resources, such as, gaming applications, or video/photo editing applications, the operating system may determine to enter a performance mode. When entering the performance mode, the refresh rate selection controller 120 could select a higher refresh rate, which can have the moving contents in the images much perceivably smoother than it originally is. On the other hand, when the electronic device 10 leaves the performance mode, the refresh rate selection controller 120 could select a lower refresh rate to reduce the power consumption.

Multimedia Events

According to various embodiment of the present invention, several operations of the electronic device 10 can lead to a multimedia event. In one embodiment, one of video playback, video recording and camera preview operations executing on the electronic device 10 could cause the multimedia event. A video decoder 152 that is internal to the processor 100 or external to the processor 100 could indicate the video playback operation when it performs video decoding process, thereby causing the multimedia event. A video encoder 160 that is internal to the AP 100 or external to the processor 100 could indicate the video recording operation when it performs video encoding process, thereby causing the multimedia event. An image signal processor 170 that is internal to the processor 100 or external to the processor 100 could indicate the camera preview operation when it provides preview images to the user, thereby causing the multimedia event.

When the multimedia event occurs, the refresh rate selection controller 120 could select a moderate refresh rate that is suitable for the current usage. For example, the multimedia events caused by video recording and camera preview operations can lead to selecting a refresh rate at 30 Hz because presenting contents regarding video recording and camera preview at the low refresh rate of 30 Hz may not degrade user's visual experience. Hence, selecting a moderate refresh rate other than a highest refresh rate can save power consumption.

In one embodiment, for the multimedia events caused by video playback operations, the refresh rate selection controller 120 could fix the refresh rate at 30 Hz or 60 Hz. This may be arranged regardless of an original frame rate of the image/video stream. This may alternatively be arranged for an original frame rate of the image/video stream to be played not exceeding 60 fps. This is because too high refresh rate may not bring too many advantages on user's visual experience but consume more power. Hence, the multimedia events caused by video playback operations may not be required to trigger the refresh rate selection controller 120 to select a high refresh rate, such as 120 Hz.

Frame Rate Monitoring

The selection of the refresh rate may be related to a frame rate of an image/video stream to be presented on the display panel 300 according to one embodiment of the present invention. In such embodiment, the processor 10 could further comprise a source generator 110 and an image stream consumer (ISC) 180. Alternatively, the source generator 110 and the ISC 180 could be external to the processor 100. The source generator 110 may be implemented with one or multiple hardware or software modules and creates graphic contents. The ISC 180 is arranged to form each frame of an image/video stream to be presented. The ISC 180 is also able to obtain information about a frame rate of the image/video stream.

If the ISC 180 detects that the image/video stream has a low frame rate, the refresh rate selection controller 120 can select a low refresh rate that is close or identical to the detected low frame rate. Also, if the ISC 180 detects that the image/video stream has a high frame rate, the refresh rate selection controller 120 can select a high refresh rate that is close or identical to the detected high frame rate. The ISC 180 monitors the frame rate of the image/video stream and immediately/intermittently notifies the refresh rate selection controller 120 of the monitored frame rate. Additionally, the processor 100 may perform a frame rate conversion on an input/video stream. The ISC 180 can also monitor the converted frame rate of the image/video stream and notify the refresh rate selection controller 120 of the converted frame rate. Then, the refresh rate selection controller 120 can determine whether to select a refresh rate different from the current one. Such operation can improve the power efficiency and/or user's visual experience.

Figure 5:
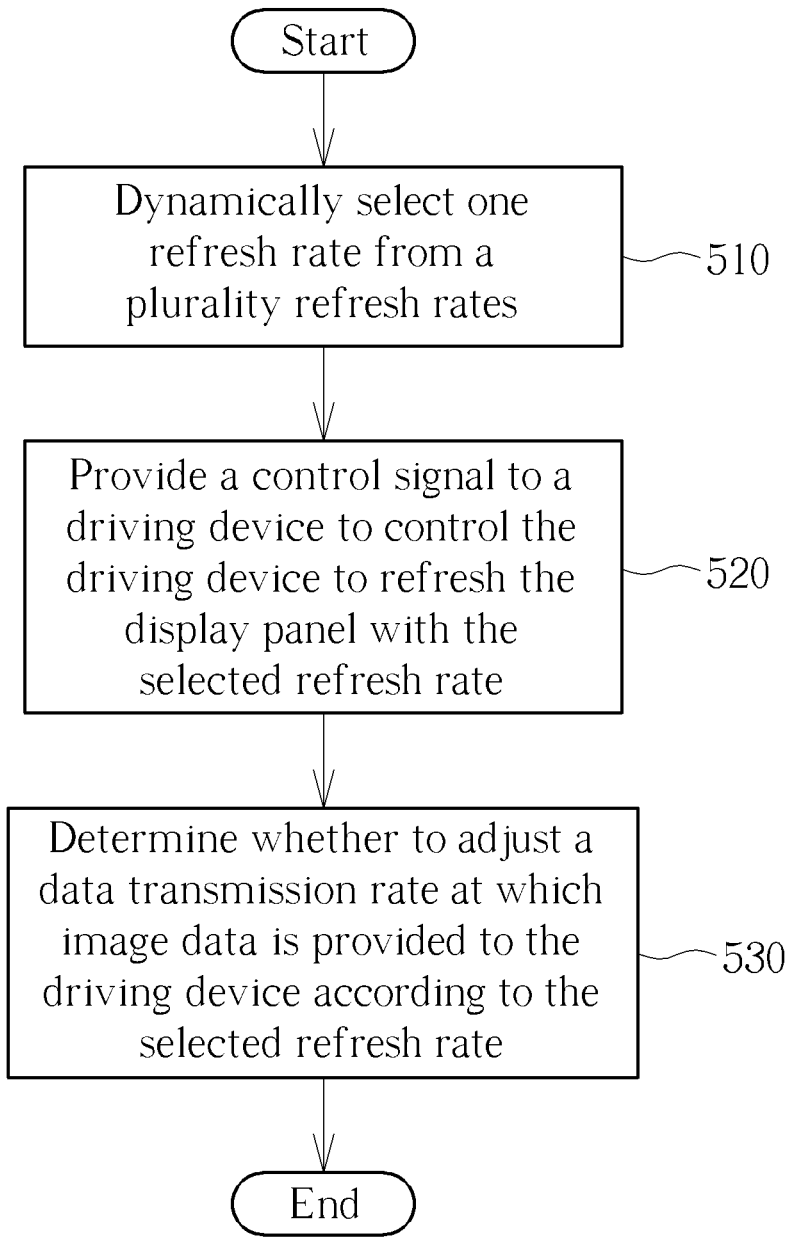
FIG. 5 illustrates a flowchart for implementing a method for switching a refresh rate of a display panel in an electronic device according to one embodiment of the present disclosure.

FIG. 5 illustrates a flowchart for implementing a method for switching a refresh rate of a display panel in an electronic device according to one embodiment of the present disclosure. The embodiment of FIG. 5 can be applied to the electronic device 10 in FIG. 1 but not limited thereto. In step 510, one refresh rate from a plurality refresh rates can be selected, for example, according to a current scenario. In step 520, a control signal such as a timing control signal or a command signal can be provided to a driving device to control the driving device to refresh the display panel with the selected refresh rate. In step 530, it can be determined whether to adjust a data transmission rate at which image data is provided to the driving device according to the selected refresh rate. Details of each step may be analogized from descriptions in the above embodiments, thus omitted here for brevity.

As mentioned above, a plurality refresh rates can be dynamically selected without a direct setting of the refresh rate by a user. As such, a suitable refresh rate can be selected for the current usage scenario. Consequently, different design requirement can be met, such as reducing power consumption in conditions of limited supply power, improving power efficiency, reducing waste of power consumption, and/or enhancing user's visual experience.

Reference throughout this specification to "one embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Circuits/modules in the embodiments of the invention may include function that may be implemented as software executed by a processor, hardware circuits or structures, or a combination of both. The processor may be a general-purpose or dedicated processor. The software may comprise programming logic, instructions or data to implement certain function for an embodiment of the invention. The software may be stored in a medium accessible by a machine or computer-readable medium, such as read-only memory (ROM), random-access memory (RAM), magnetic disk (e.g., floppy disk and hard drive), optical disk (e.g., CD-ROM) or any other data storage medium. In one embodiment of the invention, the media may store programming instructions in a compressed and/or encrypted format, as well as instructions that may have to be compiled or installed by an installer before being executed by the processor. Alternatively, an embodiment of the invention may be implemented as specific hardware components that contain hard-wired logic, field programmable gate array, complex programmable logic device, or application-specific integrated circuit, for performing the recited function, or by any combination of programmed general-purpose computer components and custom hardware component.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A processor for use in an electronic device capable of displaying, having capability of switching a refresh rate for refreshing a display panel of the electronic device, comprising:

a refresh rate selection controller, configured to dynamically select one from a plurality refresh rates; and a display controller, configured to control a driving device associated with the display panel to refresh the display panel with the selected refresh rate and determine whether to adjust a data transmission rate over an interface between the processor and the driving device according to the selected refresh rate, wherein, upon determining to adjust the data transmission rate, the display controller determines which of a first method or a second method to use to adjust the data transmission rate between the processor and the driving device using either the first method or the second method, wherein the first method comprises changing both a maximum bandwidth and a run-time bandwidth of the interface as the data transmission rate is adjusted, and wherein the second method comprises maintaining the maximum bandwidth and changing the run-time bandwidth of the interface as the data transmission rate is adjusted.

2. The processor of claim 1, wherein in controlling the driving device to refresh the display panel with the selected refresh rate, a frequency of a timing control signal passed over the interface is varied along with a change of the selected refresh rate.

3. The processor of claim 2, wherein the frequency of the timing control signal is varied to be equal to the selected refresh rate.

4. The processor of claim 2, wherein the timing control signal is from the processor to the driving device.

5. The processor of claim 2, wherein the timing control signal is from the driving device to the processor.

6. The processor of claim 1, wherein in controlling the driving device to refresh the display panel with the selected refresh rate, the display controller adjusts a frequency of a timing control signal to be equal to the selected refresh rate and provides the timing control signal to the driving device, such that the driving device refreshes the display panel according to the timing control signal.

7. The processor of claim 6, wherein the timing control signal is a V-sync signal.

8. The processor of claim 1, wherein in controlling the driving device to refresh the display panel with the selected refresh rate, the display controller sends a command to the driving device for directing the driving device to refresh the display panel with the selected refresh rate.

9. The processor of claim 8, wherein the display controller further receives a timing control signal from the driving device.

10. The processor of claim 9, wherein the timing control signal has a frequency equal to the selected refresh rate.

11. The processor of claim 9, wherein the timing control signal has a frequency unequal to the selected refresh rate for at least a partial time.

12. The processor of claim 9, wherein the timing control signal is for requesting the display controller to update a buffer circuit in the driving device.

13. The processor of claim 9, wherein the timing control signal is a tearing effect (TE) signal.

14. The processor of claim 1, wherein after adjusting the data transmission rate over the interface according to the selected refresh rate, a bandwidth of the interface is changed.

15. The processor of claim 1, wherein after the adjusting the data transmission rate over the interface according to the selected refresh rate, a bandwidth of the interface is maintained.

16. The processor of claim 1, wherein in adjusting the data transmission rate over the interface according to the selected refresh rate, the display controller increases a clock rate of a clock used for transmitting data over the interface when the refresh rate is selected to be increased, and/or decreases the clock rate of the clock used for transmitting data over the interface when the refresh rate is selected to be decreased.

17. The processor of claim 1, wherein in adjusting the data transmission rate over the interface according to the selected refresh rate, the display controller decreases a blanking/idle period of a timing control signal passed over the interface when the refresh rate is selected to be increased, and/or increases a blanking/idle period of the timing control signal when the refresh rate is selected to be decreased.

18. The processor of claim 1, wherein in adjusting the data transmission rate over the interface according to the selected refresh rate, the display controller controls a number of data transmission paths over the interface to be increased when the refresh rate is selected to be increased, and/or controls the data transmission paths over the interface to be decreased when the refresh rate is selected to be decreased.

19. The processor of claim 1, wherein in adjusting the data transmission rate over the interface according to the selected refresh rate, the display controller controls or increases a compression rate of an image data compression process when the refresh rate is selected to be increased, and/or disables or decreases the compression rate of the image data compression process when the refresh rate is selected to be decreased.

20. The processor of claim 1, wherein the refresh rate selection controller further obtains information about a current usage scenario of the electronic device and dynamically selects one of the plurality refresh rates according to the current usage scenario, and wherein the information indicates whether any of one or more predetermined events occurs.

21. The processor of claim 20, wherein the one or more predetermined events comprises at least one of web browsing, an execution of a high quality video game, a high quality video playback, a touch event, a low power event, a system status, and/or an increased/decreased frame rate of an image/video stream processed by the processor or provided by application software.

22. The processor of claim 20, wherein the processor further comprises one or more system modules internal to the processor, configured to provide the refresh rate selection controller with information about the predetermined events.

23. The processor of claim 20, wherein the processor is further coupled to one or more system modules external to processor, configured to provide the refresh rate selection controller with information about the predetermined events.

24. The processor of claim 20, wherein the information comprises monitoring/limitation information about a frame rate of an image/video stream to be displayed by the display panel, and the refresh rate selection controller selects one of the plurality refresh rates according to the monitoring/limitation information.

25. The processor of claim 24, wherein the processor further comprises a detection module, configured to detect the frame rate of an image/video stream processed by the processor and provide the detected frame rate to the refresh rate selection controller.

26. The processor of claim 20, wherein the information indicates an operation mode of the electronic device.

27. The processor of claim 26, wherein the refresh rate selection controller decreases the refresh rate when the electronic device enters a power-saving mode, and/or increases the refresh rate when the electronic device leaves the power-saving mode.

28. The processor of claim 26, wherein the refresh rate selection controller increases the refresh rate when the electronic device enters a performance mode, and/or decreases the refresh rate when the electronic device leaves the performance mode.

29. The processor of claim 1, wherein the refresh rate selection controller dynamically selects one from the plurality refresh rates without a direct setting of the refresh rate by a user.

30. An electronic device, comprising: a display panel;
a driving device, configured to drive the display panel; and
a processor, configured to control the driving device to refresh the display panel with a selected refresh rate and determine whether to adjust a data transmission rate over an interface between the processor and the driving device according to the selected refresh rate,
wherein, upon determining to adjust the data transmission rate, the processor determines which of a first method or a second method to use to adjust the data transmission rate between the processor and the driving device,
wherein the first method comprises changing both a maximum bandwidth and a run-time bandwidth of the interface as the data transmission rate is adjusted, and
wherein the second method comprises maintaining the maximum bandwidth and changing the run-time bandwidth of the interface as the data transmission rate is adjusted.

31. The electronic device of claim 30, wherein in controlling the driving device to refresh the display panel with the selected refresh rate, a frequency of a timing control signal passed over the interface is varied along with a change of the selected refresh rate.

32. The electronic device of claim 31, wherein the frequency of the timing control signal is varied to be equal to the selected refresh rate.

33. The electronic device of claim 31, wherein the timing control signal is from the processor to the driving device.

34. The electronic device of claim 31, wherein the timing control signal is from the driving device to the processor.

35. The electronic device of claim 30, wherein in controlling the driving device to refresh the display panel with the selected refresh rate, the processor adjusts the frequency of a timing control signal to be equal to the selected refresh rate and provides the timing control signal to the driving device, such that the driving device refreshes the display panel according to the timing control signal.

36. The electronic device of claim 35, wherein the timing control signal is a V-sync signal.

37. The electronic device of claim 35, wherein the electronic device is in a video mode.

38. The electronic device of claim 30, wherein in controlling the driving device to refresh the display panel with the selected refresh rate, the processor sends a command to the driving device for directing the driving device to refresh the display panel with the selected refresh rate.

39. The electronic device of claim 38, wherein the electronic device is in a command mode.

40. The electronic device of claim 38, wherein the processor further receives a timing control signal from the driving device.

41. The electronic device of claim 40, wherein a frequency of the timing control signal is equal to the selected frame rate.

42. The electronic device of claim 40, wherein a frequency of the timing control signal is unequal to the selected refresh rate for at least a partial time.

43. The electronic device of claim 40, wherein the timing control signal is for requesting the processor to update a buffer circuit in the driving device.

44. The electronic device of claim 40, wherein the timing control signal is a tearing effect (TE) signal.

45. The electronic device of claim 30, wherein after adjusting the data transmission rate over the interface according to the selected refresh rate, a bandwidth of the interface is changed.

46. The electronic device of claim 30, wherein after adjusting the data transmission rate over the interface according to the selected refresh rate, a bandwidth of the interface is maintained.

47. The electronic device of claim 30, wherein in adjusting the data transmission rate over the interface according to the selected refresh rate, the processor increases a clock rate of a clock used for transmitting data over the interface when the refresh rate is selected to be increased, and/or decreases the clock rate of the clock used for transmitting data over the interface when the refresh rate is selected to be decreased.

48. The electronic device of claim 30, wherein in adjusting the data transmission rate over the interface according to the selected refresh rate, the processor decreases a blanking/idle period of a timing control signal passed over the interface when the refresh rate is selected to be increased, and/or increases a blanking/idle period of the timing control signal when the refresh rate is selected to be decreased.

49. The electronic device of claim 30, wherein in the adjusting the data transmission rate over the interface according to the selected refresh rate, the processor controls a number of data transmission paths over the interface to be increased when the refresh rate is selected to be increased, and/or controls the data transmission paths over the interface to be decreased when the refresh rate is selected to be decreased.

50. The electronic device of claim 30, wherein in the adjusting the data transmission rate over the interface according to the selected refresh rate, the processor controls or increases a compression rate of an image data compression process when the refresh rate is selected to be increased, and/or disables or decreases the compression rate of the image data compression process when the refresh rate is selected to be decreased.

51. The electronic device of claim 50, wherein the processor further obtains a frame rate of an image/video stream to be displayed by the display panel, and selects one of the plurality refresh rates according to the frame rate.

52. The electronic device of claim 50, wherein the information comprises monitoring/limitation information about a frame rate of an image/video stream to be displayed by the display panel, and the processor selects one of the plurality refresh rates according to the monitoring/limitation information.

53. The electronic device of claim 50, wherein the information indicates an operation mode of the electronic device.

54. The electronic device of claim 53, wherein the processor decreases the refresh rate when the electronic device enters a power-saving mode and/or increases the refresh rate when the electronic device leaves a power-saving mode.

55. The electronic device of claim 53, wherein the processor increases the refresh rate when the electronic device enters a performance mode and/or decreases the refresh rate when the electronic device leaves a performance mode.

56. The electronic device of claim 30, wherein the processor further obtains information about a current usage scenario of the electronic device and dynamically selects one of the plurality refresh rates according to the current usage scenario, and wherein the information indicates whether any of one or more predetermined events occurs.

57. The electronic device of claim 56, wherein the one or more predetermined events comprises at least one of web browsing, an execution of a high quality video game, a high quality video playback, a touch event, a low power event, a system status, and/or an increased/decreased frame rate of an image/video stream processed by the processor or provided by application software.

58. The electronic device of claim 56, wherein the processor further comprises one or more system modules internal to the processor, configured to provide the processor with information about the predetermined events.

59. The electronic device of claim 56, wherein the processor is further coupled to one or more system modules external to the processor, configured to provide the processor with information about the predetermined events.

60. The electronic device of claim 30, wherein the processor dynamically selects one from a plurality refresh rates without the direct setting of the refresh rate by a user.

61. A method for switching a refresh rate of a display panel in an electronic device, comprising:
obtaining, by a processor, information about a current usage scenario of the electronic device;
dynamically selecting, by the processor, one refresh rate from a plurality refresh rates;
providing, by the processor, a control signal to a driving device associated with the display panel to control the driving device to refresh the display panel with the selected refresh rate;
determining, by the processor, whether to adjust a data transmission rate at which image data is provided from the processor to the driving device according to the selected refresh rate; and
upon determining to adjust the data transmission rate, determining, by the processor, which of a first method or a second method to use to adjust the data transmission rate between the processor and the driving device,
wherein the first method comprises changing both a maximum bandwidth and a run-time bandwidth of the interface as the data transmission rate is adjusted, and
wherein the second method comprises maintaining the maximum bandwidth and changing the run-time bandwidth of the interface as the data transmission rate is adjusted.

* * * * *